Figure 1:
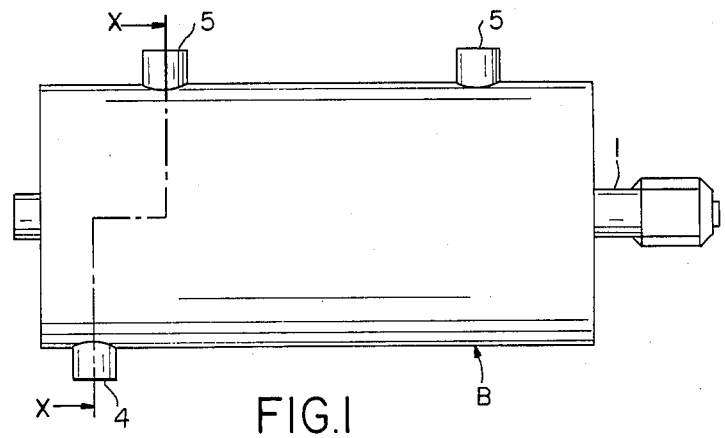

United States Patent [19]

Suzumori et al.

[11] Patent Number: 4,814,424

[45] Date of Patent: Mar. 21, 1989

[54] METHOD OF STABILIZING POLYOXYMETHYLENE COPOLYMER

[75] Inventors: Takeo Suzumori; Isamu Masumoto, both of Yokkaichi; Mitsuo Nakagawa, Suzuka; Yukihiro Iha, Yokkaichi, all of Japan

[73] Assignee: Mitsubishi Gas Chemical Company, Inc., Tokyo, Japan

[21] Appl. No.: 120,314

[22] Filed: Nov. 13, 1987

[30] Foreign Application Priority Data

Nov. 14, 1986 [JP] Japan .................................. 269525

[51] Int. Cl.[4] .............................................. C08G 2/26
[52] U.S. Cl. .................................... 528/249; 528/270; 528/425; 528/480; 528/483; 528/495; 528/497; 528/499; 525/398; 525/403; 525/405
[58] Field of Search ............... 528/249, 270, 425, 480, 528/483, 495, 497, 499; 525/398, 403, 405

[56] References Cited

U.S. PATENT DOCUMENTS

| 3,925,505 | 12/1975 | Sextro et al. | 528/417 |
| 4,070,415 | 1/1978 | Sextro et al. | 525/414 |
| 4,181,685 | 1/1980 | Kern et al. | 525/402 |
| 4,493,751 | 1/1985 | Cherdron et al. | 428/401 |

Primary Examiner—John Kight
Assistant Examiner—S. A. Acquah
Attorney, Agent, or Firm—Wenderoth, Lind & Ponack

[57] ABSTRACT

An improved method of stabilizing a polyoxymethylene copolymer, which comprises
(1) heat-melting a crude copolymer of trioxane and a cyclic ether and/or a cyclic acetal to form a first stabilized copolymer having a decomposition ratio ($D_{220}^{60}$), determined when it is heated at 220° C. for 60 minutes in vacuum, of up to 2% by weight, and then
(2) bringing the first stabilized copolymer into contact with steam containing 0.01 to 5% by weight of a basic compound at a temperature of at least 100° C. but not exceeding the melting point of the copolymer to form a second stabilized copolymer.

8 Claims, 1 Drawing Sheet

METHOD OF STABILIZING POLYOXYMETHYLENE COPOLYMER

This invention relates to an improved method of stabilizing a polyoxymethylene copolymer.

Polyoxymethylene is a useful engineering plastic which is widely used in various fields because of its excellent physical properties.

A polyoxymethylene copolymer is produced by copolymerizing trioxane as a main starting material and a cyclic ether or acetal under the action of a cationic catalyst. The crude copolymer obtained by the polymerization has the —OCH$_2$—$_n$OH group at its molecular end. Upon heating, this terminal group undergoes "zipper decomposition" and successively liberates CH$_2$O moieties. Hence, the resulting crude copolymer cannot be used directly as a molding material, and before use as a molding material, it must be subjected to a stabilization treatment at its unstable terminals. Known methods for stabilizing the crude polyoxymethylene copolymer include, for example, the acetylation, etherification or urethanization of the terminals, and the removal of the unstable portions of the crude copolymer by decomposing it until oxyalkylene units derived from the comonomer contained in the molecular chain become the ends of the molecular chain. However, when such stabilization treatments are insufficient, the quality of molded products from the treated copolymer tends to be degraded. Another defect is that the copolymer tends to undergo decomposition during molding, and the decomposition products are liable to deposit on the mold. Hence, exact and complete stabilization is very important in order to obtain a polyoxymethylene copolymer of good quality.

Japanese Patent Publications Nos. 11627/1965 and 11450/1983 and Japanese Laid-Open Patent Publication No. 63216/1985 disclose improved methods of stabilizing polyoxymethylene copolymers.

Japanese Patent Publication No. 11627/1965 describes a method comprising treating a polyoxymethylene copolymer with a vapor composed mainly of water. This method has the advantage that the apparatus used undergoes little corrosion, the separation of the copolymer is easy, and the amount of the treating liquor can be small. On the other hand, since the crude polymer is treated directly with the vapor, the stabilization treatment is not sufficient and additional stabilization treatment should be carried out.

Japanese Laid-Open Patent Publication No. 63216/1985 describes a method involving first subjecting the polyoxymethylene copolymer to a melting treatment and then treating the treated copolymer with an inert liquid medium. This method has the advantage that the copolymer can be stabilized to a high degree, but on the other hand, suffers from the defect that a step of separating the copolymer from the liquid medium is required, and the amount of the treating liquor used is large because the copolymer is handled as a slurry. The spent treating liquor used in this method contains formic acid, unreacted trioxane and polyoxymethylene oligomer in addition to formaldehyde. If the ratio of the unstable portions removed in the melting treatment is relatively low, large amounts of the above components dissolve in the treating liquor after the treatment. Hence, formaldehyde or trioxane must be separated and recovered by such means as distillation. This recovery requires an enormous amount of energy, and where the amount of the treating liquor is large, the energy cost increases. When the proportion of the unstable portions removed in the initial melting-treatment is relatively high and the concentrations of the aforesaid components dissolved in the treating liquor are low, the treating liquor can be discarded without recovering the above components. In this case, however, a large amount of the waste treating liquor must be treated until it becomes non-polluting. This also requires a high cost. Hence, in order to perform a high degree of stabilization treatment industrially advantageously at low cost, the crux is to remove the unstable portions efficiently with as small an amount of the treating liquor as possible.

Japanese Patent Publication No. 11450/1983 describes a method of stabilizing a polyoxymethylene copolymer industrially advantageously by direct heat treatment without using a solvent and the like. This method was previously developed by the present inventors.

It is an object of this invention to provide an improved method of stabilizing a polyoxymethyene copolymer.

Another object of this invention is to provide an improved stabilization method which can give a polyoxymethylene copolymer having very good thermal stability.

Still another object of this invention is to provide a method by which a highly stabilized polyoxymethylene copolymer can be produced industrially advantageously by melting treatment and steam treatment with steam whose amount is less in terms of the amount of liquid.

Further objects of this invention along with its advantages will become apparent from the following description.

According to this invention, the above objects and advantages of the invention are achieved by an improved method of stabilizing a polyoxymethylene copolymer, which comprises (1) heat-melting a crude copolymer of trioxane and a cyclic ether and/or a cyclic acetal to form a first stabilized copolymer having a decomposition ratio ($D_{220}^{60}$), determined when it is heated at 220° C. for 60 minutes in vacuum, of up to 2% by weight, and then (2) bringing the first stabilized copolymer into contact with steam containing 0.01 to 5% by weight of a basic compound at a temperature of at least 100° C. but not exceeding the melting point of the copolymer to form a second stabilized copolymer.

The polyoxymethylene copolymer to be stabilized by the method of this invention is a copolymer of trioxane with a cyclic ether and/or a cyclic acetal.

Preferably, examples of the cyclic ether and/or the cyclic acetal are ethylene oxide, 1,3-dioxolane and 1,3-dioxepane.

The polyoxymethylene copolymer to be stabilized preferably contains 0.4 to 40 mole %, especially 0.4 to 10 mole %, of oxyalkylene units derived from the cyclic ether and/or the cyclic acetal.

This polyoxymethylene copolymer can be produced by copolymerizing trioxane with the cyclic ether and/or the cylclic acetal in the presence of a polymerization catalyst. Boron trifluoride or its complex is mainly used as the polymerization catalyst. Since the copolymer obtained by this polymerization reaction contains the catalyst, it is necessary to deactivate the catalyst completely by washing the copolymer with a washing liquor containing a neutralizing agent or by adding a tertiary phosphine compound. The deactivation of the catalyst by adding a tertiary phosphine compound is disclosed in Japanese Patent Publication No. 42085/1980.

The proportion of the unstable portions in the copolymer in which the catalyst has been neutralized and washed away or deactivated is measured by the ratio of decomposition determined when it is heated at 220° C. under a vacuum of 2 to 3 mmHg for 60 minutes.

Advantageously, the polyoxymethylene copolymer to be stabilized in step (1) of the invention has a $D_{220}^{60}$ value of, for example, 3 to 15% by weight, especially 3 to 8% by weight.

The melting treatment step (1) in the method of this invention may be carried out by using a vent-equipped extruder having one or more screws, or as proposed by the present applicants in Japanese Patent Publication No. 11450/1983 which corresponds to U.S. Pat. No. 4,366,305, issued Dec. 28, 1982), by a combination of a vent-equipped extruder and a surface renewing-type mixer in a so-called degassing apparatus or heat stabilizing apparatus. The temperature at which the melting treatment step is carried out is usually 190° to 240° C.

An example of a degassing apparatus, i.e., a heat stabilizing apparatus, to be used in the present invention will now be described by reference to the accompanying drawings.

Figure 2:
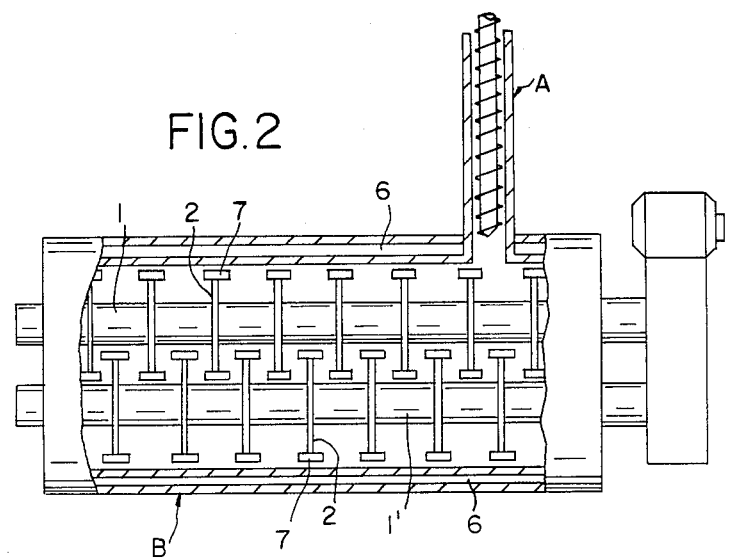
Figure 3:
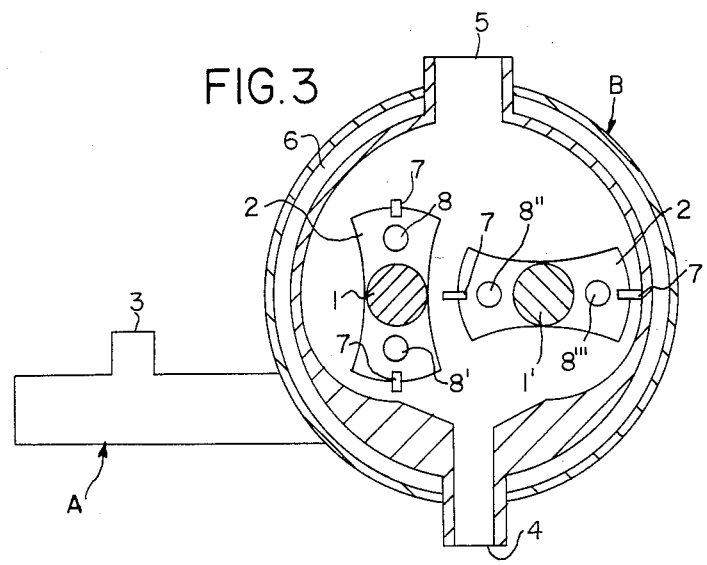

FIGS. 1 and 2 are a side elevation and a plan view, respectively, of an example of a degassing apparatus; and FIG. 3 is a cross-sectional view taken along line X—X in FIG. 1.

In FIG. 2 the degassing apparatus is made up by coupling a screw extruder A and a surface renewing-type mixer B. It must be understood however that the relative sizes of A and B are not necessarily shown as actually practiced. Further, it should be understood that various methods of connecting A and B are available.

The extruder A is an ordinary used extruder provided with a single or plurality of shafts. Included are not only those of the paddle-equipped type as in the case of the ZSK extruder marketed by Werner & Pfleiderer Engineers but also the double intermeshing screw-type extruder such as the ZDS extruder of the same company. A power of a crude oxymethylene copolymer is heat-melted by the aforesaid extruder, and the molten resin is fed to the mixer via a coupling part. The decomposed gas resulting from the decomposition of the instable portions of the resin in the extruder is removed via a vent 3.

The surface renewing-type mixer B has a plurality of scraping blades 2 fitted to each of the two stirring shafts 1 and 1', In FIGS. 2 and 3 the plurality of blades 2 are so disposed that they do not collide with one another when stirring shafts 1 and 1' rotate, and whereby the blades rotate while maintaining a slight clearance between their tips and the inside surface of the casing and the surface of the other stirring shaft.

Inside the mixer B the resin, while being heated by means of the heating medium in the jacket 6, is mixed by the plurality of blades 2 in concomitance with the rotation of the stirring shafts 1 and 1' and, while its surface is being renewed, is conveyed to a discharge opening 4. The decomposed gas that volatilized as a result of the surface renewal is discharged via the gas vent 5.

In FIG. 3 the scraping blades are provided with escape holes 8, 8', 8" and 8"' for the molten copolymer, and their tips, auxiliary blades 7, for effectively carrying out the scraping of the inside surface of the casing.

The relative positions in which the scraping blades are fitted to the stirring shafts 1 and 1' need not necessarily be shown in FIG. 2 but may be, for example, as shown in FIG. 4. Thus, the scraping blades may be so fitted to the shafts that they rotate while maintaining a slight clearance between their tips and the inside surface of the casing and the other corresponding blade.

Further, the configuration of the scraping blade, in addition to that shown in FIG. 3, may also be as shown in FIGS. 5-(a), (b), (c), (d), and (e). The blades having the configuration shown in FIG. 5 are suitably used for mixing and surface renewal of high viscosity materials ranging from 2000 poises to 20,000 poises. It is preferred that the operation of the surface renewing-type mixer be carried out so that the molten resin does not completely fill the total effective volume inside the mixer but occupies only about one-half of the volume, thus maintaining at all times a space inside the mixer to ensure that the surface renewal action is effectively carried out. The control of the amount of polymer packed inside the surface renewing-type mixer B is achieved by regulating the balance between the flow rates at the extruder A mounted at the feed inlet of the surface renewing-type mixer and the withdrawal screw extruder (not shown) mounted at the discharge opening 4. The amount of polymer packed can be readily observed by the provision of an inspection window at the upper part of the surface renewing-type mixer.

The hold-up per unit shaft length of this surface renewing-type mixer is much greater than that of the extruder-type mixer, and hence a apparatus cost per unit of copolymer treated is much lower.

A stabilizer may be added in the melting treatment step in order to prevent breakage of the main chain of the oxymethylene copolymer and to obtain a molding material of good quality. Any of known stabilizer compounds can be used. Combinations composed of (1) at least one compound selected from the group consisting of hydroxides, inorganic acid salts, carboxylic acid salts and alkoxides of alkali metals or alkaline earth metals, (2) at least one compound selected from the group consisting of nitrogen-containing high-molecular-weight compounds and amine-substituted triazines and (3) sterically hindered phenols are especially preferred. Stabilizers to be so combined are disclosed, for example, in Japanese Laid-Open Patent Publications Nos. 78256/1978 and 18640/1981.

At the time of the melting treatment, water or an alcohol may be added in an amount of 2 to 25% based on the weight of the copolymer in order to promote decomposition of the unstable portions. Advantageously, water or the alcohol is used with a combination of an extruder and a surface renewing-type mixer, and added to the joining part between the extruder and the surface renewing-type mixer or to the surface renewing-type mixer to minimize damage to the apparatus. Unlike the extruder, the surface renewing-type mixer allows a relatively large latitude of selecting the material of which it is made, and corrosion-resistant materials can be selected.

The copolymer after the melting treatment is again solidified by cooling to form a first stabilized copolymer. The first stabilized copolymer has a $D_{220}^{60}$ value of up to 2% by weight, preferably 0.15 to 1% by weight, more preferably 0.15 to 0.5% by weight.

It is only after the melting-treatment is carried out until the $D_{220}^{60}$ value decreases up to 2% by weight that the steam treatment in the next step acts effectively to give a product having good thermal stability.

The first stabilized copolymer has a formaldehyde generated amount, measured by a method to be described hereinafter, of preferably 0.25 to 1.5% by weight.

The first stabilized copolymer is pelletized to a size of 2 to 3 mm. The pellets of this size are advantageously used in the next steam treatment step (2).

In the next step (2), the first stabilized copolymer is brought into contact with steam containing 0.01 to 5% by weight of a basic compound at a temperature of at least 100° C. but not exceeding the melting point of the copolymer.

Examples of the basic compounds are ammonia and mono-, di- or tri-alkylamines having 1 to 4 carbon atoms in the alkyl moiety, such as triethylamine, diethylamine and tributylamine.

In step (2), steam containing 0.05 to 0.5% by weight of the basic compound is preferably used.

The steam treatment is carried out at a temperature of at least 100° C. but not exceeding the melting point of the copolymer. Desirably, the steam treatment is carried out at such a temperature within the abovespecified range at which the pellets do not adhere to one another. The preferred steam treatment temperature is 100° to 150° C.

The pressure used in the steam treatment is such that the temperature of steam can be maintained at the intended value. For this purpose, superheated steam may be used. The contact time differs depending upon the temperature, and is usually 10 minutes to several hours. The preferred amount of steam used is about 0.1 to 3 times the weight of the copolymer. One important characteristic of this invention is that the amount of the treating steam (medium) is very small. After use in treating the copolymer, the steam is, as required, conducted to a heat exchanger and condensed. When a large amount of the copolymer is treated, the thermal energy can be recovered, as required, by generating hot water or steam having a lower pressure than the steam used in the treatment in the heat-exchanger. The condensed liquid, as required, is sent to a step of recovering formaldehyde, etc. Usually, it can be treated to render it nontoxic and then discharged.

The step (2) of the method of this invention gives a second stabilized copolymer as a product.

The second stabilized copolymer shows a $D_{220}^{60}$ value of preferably up to 0.3% by weight, more preferably 0.03 to 0.2% by weight.

The second stabilized copolymer shows a formaldehyde generated amount of preferably up to 0.5% by weight, more preferably 0.1 to 0.3% by weight.

According to this invention, a highly stabilized polyoxymethylene copolymer can be obtained by using a much less amount of a treating medium than in the conventional methods, and no great energy is required therefor for separating the treating medium. In this sense, the method of this invention is very advantageous in industrial practice.

The following examples illustrate the present invention specifically. The intrinsic viscosity, $D_{220}^{60}$ and the amount of formaldehyde generated (formaldehyde generated amount) were measured by the following method.

Intrinsic viscosity

Measured at 60° C. in p-chlorophenol containing 2% by weight of alpha-pinene (unit: dl/g).

$D_{220}^{60}$

The ratio of decomposition (% by weight) when the copolymer was heated at 220° C. for 60 minutes under a vacuum of 2 to 3 mmHg.

Formaldehyde generated amount

The copolymer (0.5 g) was placed in a glass test tube with a capacity of about 50 ml. The inside of the test tube was purged with nitrogen, and then the tube was sealed up. The test tube was heated at 227° C. for 60 minutes. Formaldehyde in nitrogen was quantitatively measured by gas chromatography. The weight % of formaldehyde based on the copolymer was calculated.

REFERENTIAL EXAMPLE 1

Production of crude polyoxymethylene copolymer:

A continuous polymerization reaction apparatus having the following structure was used.

A mixer comprised of a long casing having a jacket therearound, a pair of shafts disposed within the casing, and many elliptical plates adapted to be in mesh with each other and fitted in the respective shafts, the long end portions of the elliptical plates being capable of cleaning the inside surface of the casing and the surfaces of the meshing elliptical plates, was used as a first-stage polymerization apparatus. A horizontal stirring device having a long casing with a jacket therearound, a pair of shafts disposed within the casing and stirring vanes suitable for powder mixing but without self-cleaning property attached to the shafts was directly connected to the first-stage polymerization machine, and used as a second-stage polymerization apparatus.

To the second-stage polymerization apparatus was further directly connected another horizontal stirring device of the same type. A deactivating agent for a polymerization catalyst was injected into this horizontal stirring device so that it can be continuously mixed with a crude polymer powder.

Trioxane containing 2.5% by weight of ethylene oxide was fed into the first-stage polymerization apparatus, and 0.10 millimole, per mole of trioxane, of boron trifluoride diethyl etherate was added. The polymerization temperature was adjusted to 85° C., and the monomers were copolymerized. The copolymerization reaction mixture containing 20% of the unreacted monomers was fed to the second-stage polymerization apparatus. The temperature was adjusted to 50° C., and the copolymerization reaction was completed. The reaction mixture was sent to the above other horizontal stirring device and mixed with benzene solution containing 0.2 millimole, per mole of the trioxane used in the copolymerization, of triphenylphosphine. The crude copolymer was vacuum-dried at 60° C. for 10 hours. The resulting crude copolymer had an intrinsic viscosity of 1.45 dl/g and a $D_{220}^{60}$ of 6.0%.

EXAMPLE 1

(a) Melting treatment

To the crude copolymer obtained in Referential Example 1 were added 0.1% of calcium hydroxide, 0.2% of melamine and 0.6% of 2,2'-methylenebis(4-methyl-6-tertbutylphenol) as stabilizers (the same stabilizers were used in the following examples). The mixture was fed into a vent-equipped single-screw extruder, and melt-extruded at 200° C. while degassing. This crude copolymer had a $D_{220}^{60}$ of 3.0%. The crude copolymer which left the extruder was immediately fed into a surface renewing type mixer and mixed at 215° C. and 200 mmHg while degassing. The residence time in the mixer was about 20 minutes. The copolymer which left the mixer was cooled and solidified and pelletized to a size of 2 to 3 mm. The resulting copolymer had an intrinsic viscosity of 1.46 dl/g, a $D_{220}^{60}$ of 0.30%, and a formaldehyde generated amount of 0.52%.

(b) Steam treatment

A pressure reactor equipped with a stirrer was charged with 100 parts by weight of the copolymer obtained after the melting treatment, and steam containing 0.1% by weight of ammonia was fed from an upper part of the reactor at a rate of 50 parts by weight per hour. The reactor temperature was maintained at 140° C. After feeding steam for 1 hour, the feeding of the steam was stopped, and the pressure of the inside of the reactor was returned to atmospheric pressure. Air at 100° C. was passed through the reactor to dry the copolymer. The resulting copolymer had an intrinsic viscosity of 1.46 dl/g, a $D_{220}^{60}$ of 0.10% and a formaldehyde generated amount of 0.18%.

The steam which left the reactor was conducted to a heat exchanger and about 50 parts of the condensed liquid was obtained. The amount of formaldehyde in the condensed liquid, measured by gas chromatography, was 0.35%.

EXAMPLE 2

The same copolymer as obtained in the melting treatment (a) of Example 1 was subjected to the same steam treatment as in Example 1 using steam containing 0.1% by weight of triethylamine. The resulting copolymer had an intrinsic viscosity of 1.46 dl/g, a $D_{220}^{60}$ of 0.08% and a formaldehyde generated amount of 0.16%.

EXAMPLE 3

The same copolymerization as in Referential Example 1 was carried out. After the copolymerization, the stabilizers were added to the crude copolymer. The mixture was fed into a vent-equipped twin screw extruder, and melt-extruded at 210° C. while degassing from the vent opening. The resulting copolymer had a $D_{220}^{60}$ of 1.0%. Immediately then, the copolymer was fed into a surface renewing-type mixer, and mixed with a residence time of 20 minutes as in Example 1. The copolymer had an intrinsic viscosity of 1.46 dl/g, a $D_{220}^{60}$ of 0.20% and a formaldehyde generated amount of 0.35%.

The resulting copolymer was treated with steam containing 0.1% by weight of triethylamine in the same way as in Example 1. The resulting copolymer had an intrinsic viscosity of 1.46 dl/g, a $D_{220}^{60}$ of 0.07% and a formaldehyde generated amount of 0.15%.

COMPARATIVE EXAMPLE 1

A copolymer having a $D_{220}^{60}$ of 3.0% extruded from a vent-equipped extruder in the same way as in Example 1 was cooled and solidified and pelletized to a size of 2 to 3 mm. Without the melting treatment, the copolymer was treated with steam in the same way as in Example 1. The resulting copolymer had an intrinsic viscosity of 1.45 dl/g, a $D_{220}^{60}$ of 0.63% and a formaldehyde generated amount of 1.02%.

REFERENTIAL EXAMPLE 2

Trioxane containing 2.8% by weight of 1,3-dioxolane was fed into the same first-stage polymerization apparatus as shown in Referential Example 1, and 0.001 part by weight, per part by weight of trioxane, of methylal as a molecular weight controlling agent and 0.10 millimole, per mole of trioxane, of boron trifluoride diethyl etherate were added. The polymerization temperature was adjusted to 80° C., and the monomers were copolymerized. The second-stage polymerization apparatus and the agitating device for deactivating the catalyst were operated in the same way as in Referential Example 1. The crude copolymer was vacuum-dried at 60° C. for 10 hours. The resulting crude copolymer had an intrinsic viscosity of 1.10 dl/g and a $D_{220}^{60}$ of 7.0%.

EXAMPLE 4

The stabilizers were added to the crude copolymer obtained in Referential Example 2, and the mixture was fed into a vent-equipped single-screw extruder, and melt-extruded in the same way as in Example 1. The crude copolymer had a $D_{220}^{60}$ of 3.6%. The crude copolymer was introduced into a surface renewing type mixer, and at this time, 4% by weight, based on the crude copolymer, of a 2% by weight aqueous solution of triethylamine was added to the joint part between the extruder and the mixer. While maintaining the mixer under slightly reduced pressure, the copolymer and the stabilizer were mixed at 210° C. with a residence time of about 25 minutes. The resulting copolymer had an intrinsic viscosity of 1.10 dl/g, a $D_{220}^{60}$ of 0.18% and a formaldehyde generated amount of 0.30%.

The copolymer was subjected to the same steam treatment as in Example 2 using the same pressure reactor as used in Example 1. The resulting copolymer had an intrinsic viscosity of 1.10 dl/g, a $D_{220}^{60}$ of 0.05% and a formaldehyde generated amount of 0.13%. No corrosion was observed in the surface renewing-type mixer.

COMPARATIVE EXAMPLE 2

In Example 4, the crude copolymer having a $D_{220}^{\alpha}$ of 3.6% after melt extrusion was directly cooled and solidified and pelletized to a size of 2 to 3 mm without introducing it into the surface renewing-type mixer. The pellets were subjected to the same steam treatment as in Example 4. The resulting copolymer had an intrinsic viscosity of 1.09 dl/g, a $D_{220}^{60}$ of 0.80% and a formaldehyde generated amount of 1.43%.

EXAMPLE 5

The stabilizers were added to the crude copolymer obtained in Referential Example 2, and the mixture was fed into a vent-equipped twin-screw extruder, and with degassing, melt-extruded at 210° C. to give a copolymer having a $D_{220}^{60}$ of 0.73%. The copolymer was subjected to the same steam treatment as in Example 1 to give a copolymer having an intrinsic viscosity of 1.11 dl/g, a $D_{220}^{60}$ of 0.18% and a formaldehyde generated amount of 0.28%.

COMPARATIVE EXAMPLE 3

The same crude polymer as in Example 5 was melt-extruded in a vent-equipped twin-screw extruder at 195° C. while degassing to give a copolymer having a $D_{220}^{60}$ of 2.7%. The copolymer was subjected to the same steam treatment as in Example 5 to give a copolymer having an intrinsic viscosity of 1.10 dl/g, a $D_{220}^{60}$ of 0.78% and a formaldehyde generated amount of 1.23%.

What is claimed is:

1. An improved method of stabilizing a polyoxymethylene copolymer, which comprises
    (1) heat-melting a crude copolymer of trioxane and a cyclic ether and/or a cyclic acetal to form a first stabilized copolymer having a decomposition ratio ($D_{220}^{60}$), determined when it is heated at 220° C. for 60 minutes in vacuum, of up to 2% by weight, and then
    (2) bringing the first stabilized copolymer into contact with steam containing 0.01 to 5% by weight of a basic compound at a temperature of at least 100° C. but not exceeding the melting point of the copolymer to form a second stabilized copolymer.

2. The method of claim 1 wherein the heat-melting in step (1) is carried out at a temperature of 190° to 240° C.

3. The method of claim 1 wherein the first stabilized polymer formed in step (1) has a decomposition ratio ($D_{220}^{60}$) of 0.15 to 1% by weight.

4. The method of claim 1 wherein the heat-melting in step (1) is carried out by using a heat-melting apparatus comprised of a combination of a vent-equipped extruder having one or more screws and a surface renewing-type mixer.

5. The method of claim 4 wherein water or an alcohol is added to the joint portion between the extruder and the surface renewing-type mixer or to the surface renewing-type mixer.

6. The method of claim 1 wherein the steam treatment in step (2) is carried out at a temperature of 100° to 150° C.

7. The method of claim 1 wherein the steam treatment in step (2) is carried out using steam containing 0.05 to 0.5% by weight of the basic compound.

8. The method of claim 1 wherein the second stabilized copolymer formed in step (2) has a decomposition ratio ($D_{220}^{60}$) of 0.03 to 0.2% by weight.

* * * * *